United States Patent Office 3,536,530
Patented Oct. 27, 1970

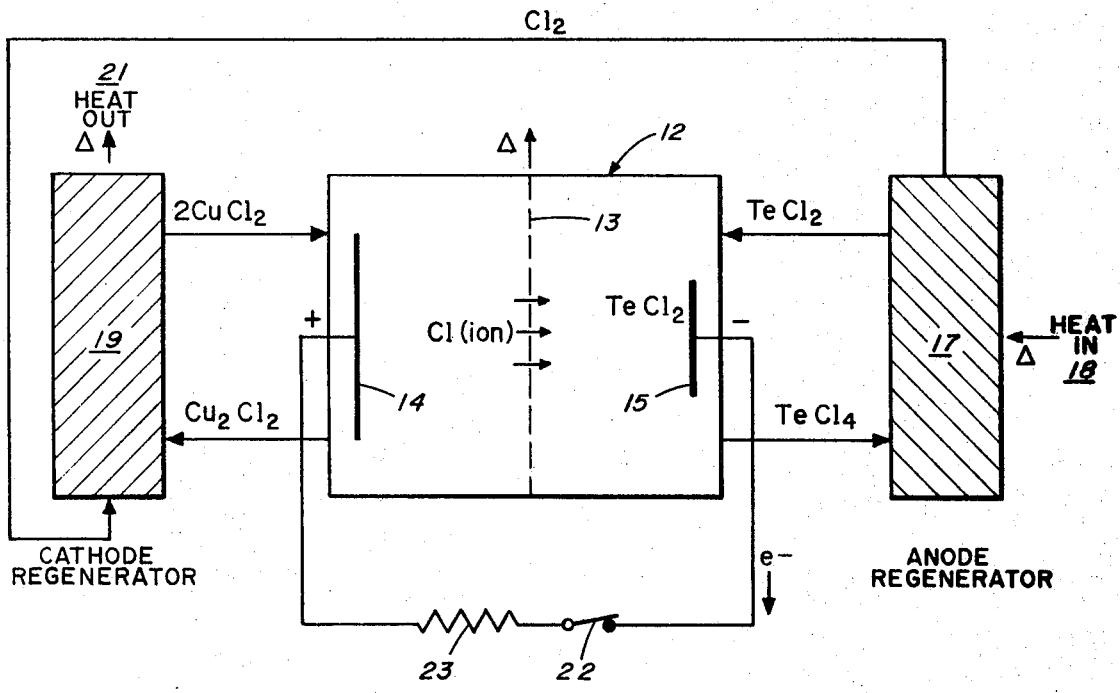

---

3,536,530
TELLURIUM CHLORIDE THERMOREGEN-
ERATIVE GALVANIC CELL
David E. Anthes and Ted M. Rymarz, Chicago, Ill., assignors, by mesne assignments, to the United States of America as represented by the Secretary of the Navy
Filed Jan. 2, 1969, Ser. No. 789,100
Int. Cl. H01m *35/02*
U.S. Cl. 136—6  7 Claims

ABSTRACT OF THE DISCLOSURE

A regenerative process for a tellurium chloride cell under exact conditions of temperature and pressure and with the help of complexing agents such as $GaCl_3$ or $AlCl_3$.

BACKGROUND OF THE INVENTION

Field of the invention

This invention relates to cells in which the electrodes are in liquid form and in which a regenerative process is continuously carried on so that the output of the cell may be continuous, and more particularly to that portion of the cell relating to the regenerative process.

SUMMARY OF THE INVENTION

The invention consists of a process for separating $TeCl_2$ from $TeCl_4$ in a thermally regenerative galvanic cell which produces power according to (1) 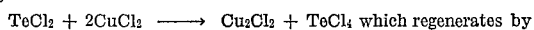
$TeCl_2 + 2CuCl_2 \longrightarrow Cu_2Cl_2 + TeCl_4$ which regenerates by (2) 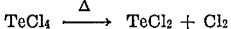
$TeCl_4 \xrightarrow{\Delta} TeCl_2 + Cl_2$ (3) 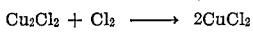
$Cu_2Cl_2 + Cl_2 \longrightarrow 2CuCl_2$ In the number 2 reaction $TeCl_2$ and $Cl_2$ are both gases at the temperature required to break down $TeCl_4$ and are hard to separate. The present invention complexes the $TeCl_4$ with a trichloride of either gallium (Ga) or aluminum (Al).

BRIEF DESCRIPTION OF THE DRAWING

The figure is a diagram showing the regenerative process.

The present invention sets up the process for the efficient regeneration of $TeCl_2$ and $Cl_2$ from the reaction product tellurium tetrachloride ($TeCl_4$) of a thermally regenerative galvanic cell.

Referring to the drawing, a cell 12 is shown having an ion exchange membrane 13 and contact plates 14 and 15, 14 being the cathode and 15 being the anode. The chemical reaction is $TeCl_2 + 2CuCl_2 \rightarrow TeCl_4 + Cu_2Cl_2$ to produce the free electrons *e* shown at 16 on the drawing to give a flow of current.

The regenerative process is carried on simultaneously with the production of electric current from the chemical reaction, above, and primarily consists of changing the $TeCl_4$ to $TeCl_2 + Cl_2$, the reaction at the anode; the cathode reaction being $Cu_2Cl_2 + Cl_2 \rightarrow 2CuCl_2$ to give the original electrodes which will then produce a continuous flow of electricity as the result of applying the regenerative process.

The regenerative process is carried out at 650° C. and at 18 atm. abs. During the development of this process the regenerative process was carried out at 550° C. and a 1 atm. pressure, the result being that both the $TeCl_2$ and $Cl_2$ were both gaseous and unseparable. However, it was found that certain compounds such as the trichlorides of gallium and aluminum were liquid in the temperature region where the thermal regeneration occurred. It was found that $TeCl_4 + GaCl_3$ complex at 650° C. and 18 atm. abs. released a percentage of its available chlorine based on the reaction:

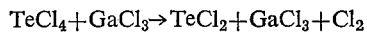
$TeCl_4 + GaCl_3 \rightarrow TeCl_2 + GaCl_3 + Cl_2$

A five percent regeneration is considered sufficient for the successful operation of an integrated tellurium chloride thermo-regenerative galvanic cell.

The drawing shows diagrammatically the reaction of the regenerative process as carried on outside of the cell while actually the process is within the cell at the cathode regeneration and without the cell at the anode regeneration, and simultaneous with the production of electric current.

Referring again to the diagram where the regenerative process is pictured as being outside of the cell while actually the process is carried out partially within the cell, the anode regeneration is shown at 17 where the $TeCl_4$ plus heat at 18 produces the $TeCl_2 + Cl_2$ which transfers to the cathode regenerator 19 to give the $2CuCl_2$, the heat escaping at 21. While the flow of electric current is continuous a switch 22 is shown in the circuit 23. Any suitable source of heat indicated at 18 may be inferred while not shown on the diagram, other than the indication.

The operation of the thermo-regenerative cell is as follows:

At the anode, a $TeCl_2$ molecule gives up an electron to the current collector resulting in a $TeCl_2$ positive ion which remains in the anode electrode. The electron travels around the external circuit to the plate 15. Here the electron becomes attached to a $CuCl_2$ molecule in the cathode electrode and forms a Cl negative ion which penetrates the ion exchange membrane and combines with the $TeCl_2$ positive ion in the anode electrode. Two such Cl negative ions so combined form a neutral $TeCl_4$ molecule. This is a normal oxidation-reduction reaction. The reactant product of the cathode electrode is $Cu_2Cl_2$ and $TeCl_4$ at the anode electrode.

The neutral $TeCl_4$ is passed into a chamber where it forms a complex with added trichloride of gallium or aluminum. It is heated to a temperature of 550° C. and at a pressure of 18 atm. abs. to drive off, first the $Cl_2$ in the form of gas, and then the $TeCl_2$ also in the form of a gas. The $Cl_2$ is conducted to the cathode electrode where it combines with the $Cu_2Cl_2$ to provide the original $2CuCl_2$ while the cooled $TeCl_2$ is returned to the anode electrode side of the cell.

To provide a continuous current it is necessary to have a 5 percent return from the regenerative cell, thus providing a continuous electric current by the application of heat.

What is claimed is:
1. In a thermally regenerative galvanic cell having a liquid anode of $TeCl_2$ and a liquid cathode of $CuCl_2$, a regenerative process comprising:
   maintaining an ion exchange screen between the electrodes;
   passing chlorine ions through the exchange screen to form $TeCl_4$ and to give off free electrons;
   passing the $TeCl_4$ into a container adjacent the cell;
   heating the $TeCl_4$ together with a trichloride of aluminum $AlCl_3$ to a temperature of 550° C. and under a pressure of 18 atm. abs.
   removing $Cl_2$ and returning the chlorine to the $Cu_2Cl_2$ to produce $CuCl_2$;
   separating the $TeCl_2$ from the $AlCl_3$ and returning the $TeCl_2$ to the cell.
2. A process according to claim 1 where $AlCl_3$ is replaced by $GaCl_3$.
3. A thermally regenerative galvanic cell comprising:
   a casing;

an ion exchange membrane dividing the casing into an anode and a cathode compartment;
a liquid $TeCl_2$ electrode forming the anode;
a liquid $CuCl_2$ electrode forming the cathode;
an anode plate;
a cathode plate;
an outside circuit connecting said plates establishing current flow upon breakdown of the anode electrode.
a heating chamber connected to each of the compartments adapted to receive the neutralized anode electrode;
means for heating the chamber;
means for maintaining a desired pressure within said heating chamber whereby the anode electrode, made neutral through the generation of an electric current, may be changed back by the application of heat under controlled pressure.

4. A cell according to claim 3 where the anode electrode is $TeCl_2$ and the cathode electrode is $CuCl_2$.

5. A cell according to claim 4 and including $AlCl_3$ as an additive within the heating chamber.

6. A cell according to claim 4 and including $GaCl_3$ as an additive within the heating chamber.

7. A cell according to claim 4 wherein the heat is maintained at 550° C. and the pressure at 18 atm. abs.

References Cited

UNITED STATES PATENTS

| | | | |
|---|---|---|---|
| 3,319,734 | 5/1967 | McCully | 136—6 |
| 3,404,035 | 10/1968 | Kummer et al. | 136—6 |
| 3,441,446 | 4/1969 | Heredy | 136—6 |

WINSTON A. DOUGLAS, Primary Examiner
C. F. LeFEVOUR, Assistant Examiner

U.S. Cl. X.R.

136—83